(12) United States Patent
Bae et al.

(10) Patent No.: US 11,508,129 B2
(45) Date of Patent: Nov. 22, 2022

(54) 3D WINDOW MANAGEMENT METHOD USING PROJECTIVE GEOMETRY IN AUGMENTED REALITY AND VIRTUAL REALITY

(71) Applicant: Korea Advanced Institute of Science and Technology, Daejeon (KR)

(72) Inventors: Seok Hyung Bae, Daejeon (KR); Joon Hyub Lee, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/754,959

(22) PCT Filed: Oct. 18, 2018

(86) PCT No.: PCT/KR2018/012314
§ 371 (c)(1),
(2) Date: Apr. 9, 2020

(87) PCT Pub. No.: WO2019/078632
PCT Pub. Date: Apr. 25, 2019

(65) Prior Publication Data
US 2020/0242844 A1 Jul. 30, 2020

(30) Foreign Application Priority Data
Oct. 20, 2017 (KR) .................. 10-2017-0136760

(51) Int. Cl.
*G06T 19/00* (2011.01)
*G06F 3/01* (2006.01)
*G06T 3/40* (2006.01)

(52) U.S. Cl.
CPC .......... *G06T 19/006* (2013.01); *G06F 3/013* (2013.01); *G06F 3/017* (2013.01); *G06T 3/40* (2013.01);
(Continued)

(58) Field of Classification Search
CPC ..... G06T 19/006; G06T 3/40; G06T 2200/24; G06T 2219/2016; G06F 3/013; G06F 3/017
See application file for complete search history.

(56) References Cited

U.S. PATENT DOCUMENTS

2016/0239080 A1\* 8/2016 Marcolina .............. G06F 1/163
2017/0060230 A1 3/2017 Faaborg
2018/0318703 A1\* 11/2018 Kake ..................... A63F 13/211

FOREIGN PATENT DOCUMENTS

JP     2017102732 A   6/2017
JP       6093473 B1   2/2018
(Continued)

OTHER PUBLICATIONS

Microsoft Corporation, "Windows 10", released in Jul. 2015. (p. 4 shows release date) (Year: 2015).\*
(Continued)

*Primary Examiner* — Chong Wu
(74) *Attorney, Agent, or Firm* — Loginov & Associates, PLLC; William A. Loginov

(57) ABSTRACT

An image processing method and an image processing apparatus are disclosed. An image processing method according to an embodiment includes the steps of: obtaining a position of a user's hand; and controlling a virtual window on the basis of the position of the hand.

14 Claims, 8 Drawing Sheets

(52) U.S. Cl.
CPC .. *G06T 2200/24* (2013.01); *G06T 2219/2016* (2013.01)

(56) References Cited

FOREIGN PATENT DOCUMENTS

| KR | 20120062170 | 6/2012 |
| KR | 20150032028 | 3/2015 |
| KR | 20170096420 | 8/2017 |

OTHER PUBLICATIONS

Kinetic, "With a perspective camera: Distance independent size gameobject", posted on answers.unity.com, on Jun. 17, 2012. see p. 1. https://answers.unity.com/questions/268611/with-a-perspective-camera-distance-independent-siz.html (Year: 2012).*

* cited by examiner

3D WINDOW MANAGEMENT METHOD USING PROJECTIVE GEOMETRY IN AUGMENTED REALITY AND VIRTUAL REALITY

TECHNICAL FIELD

Example embodiments relate to an image processing method and an image processing device. For example, example embodiments may process an image through a 3D window management method which uses projective geometry in augmented reality and virtual reality.

BACKGROUND ART

We imagine the future in which a wearable device obtains information from the Internet and local nodes. For example, a user may imagine the future of immersive computing where he or she wears smart glasses on his or her head and downloads information from the Internet of things (IoT) to spaces around the user as interactive virtual elements.

Herein, the user may freely choose how much of such virtual elements to incorporate in his or her own reality. For example, the user may improve surrounding environments through augmented reality (AR) or may completely replace surrounding environments through virtual reality (VR).

Whenever a specific computing form factor has become generalized, for example, when the desktop computer appeared in 1980s or when the smartphone appeared in 2000s, a user interface (UI) for facilitating such a computing form factor has been developed.

When a developer designs a new UI, he or she may optionally borrow and design the concept from the previous paradigm, such as windows, icons, menus, pointer (WIMP) and a touch user interface (TUI), as much as necessary. Designing the UI based on the previous paradigm may help to construct a friendlier and a more familiar UI.

Disclosure of Invention

Technical Subject

An aspect provides a user interface (UI) for operating adaptively to an intention of a user on augmented reality (AR) or virtual reality (VR).

Furthermore, another aspect also provides a technology of allowing a user to easily control a virtual window on AR or VR.

Technical Solution

According to an aspect of the present invention, there is provided a 3D window management method including obtaining a location of a hand of a user and controlling a virtual window based on the location of the hand.

The controlling may include performing at least one of selecting, moving, scaling, and placing the virtual window based on the location of the hand.

The obtaining of the location of the hand may include obtaining a location of a fingertip of the user.

The obtaining of the location of the fingertip may include obtaining a location of the end of the thumb of the user and obtaining a location of the end of the index finger of the user.

The controlling may include generating a cursor, when a distance between the end of the thumb of the user and the end of the index finger of the user is less than or equal to a reference value and selecting the virtual window based on the cursor.

The controlling may include deselecting and placing the selected virtual window on a plane specified by the user while maintaining an apparent size, when the distance is greater than the reference value.

The generating of the cursor may include generating a circular cursor where the distance between the end of the thumb and the end of the index finger is a diameter.

The selecting of the virtual window based on the cursor may include activating the virtual window overlapped with the circular cursor.

The selecting of the virtual window based on the cursor may further include placing the activated virtual window at the location of the hand while maintaining an apparent size, when the end of the thumb and the end of the index finger are touching.

The controlling may include scaling the virtual window based on locations of the eyes of the user and the location of the hand.

The scaling may include scaling up the virtual window, as the locations of the eyes and the location of the hand move closer to each other and scaling down the virtual window, as the locations of the eyes and the location of the hand move farther from each other.

The scaling may include scaling up or down the virtual window while maintaining an absolute size.

According to another aspect of the present invention, there is provided a 3D window management device including a sensor to obtain a location of a hand of a user, a controller to control a virtual window based on the location of the hand, in VR or AR, and a display to implement VR or AR in response to control of the controller.

The controller may perform at least one of selecting, moving, scaling, and placing the virtual window based on the location of the hand.

The sensor may obtain a location of a fingertip of the user.

The sensor may obtain a location of the end of the thumb of the user and may obtain a location of the end of the index finger of the user.

The controller may generate a cursor, when a distance between the end of the thumb of the user and the end of the index finger of the user is less than or equal to a reference value and may select the virtual window based on the cursor.

The controller may deselect and place the selected virtual window on a plane specified by the user while maintaining an apparent size, when the distance is greater than the reference value.

The controller may generate a circular cursor where the distance between the end of the thumb and the end of the index finger is a diameter.

The controller may activate the virtual window overlapped with the circular cursor.

The controller may place the activated virtual window at the location of the hand while maintaining an apparent size, when the end of the thumb and the end of the index finger are touching.

The controller may scale the virtual window based on locations of the eyes of the user and the location of the hand.

The controller may scale up the virtual window as the locations of the eyes and the location of the hand move closer to each other and may scale down the virtual window as the locations of the eyes and the location of the hand move farther from each other.

The controller may scale up or down the virtual window while maintaining an absolute size.

BEST MODE FOR CARRYING OUT THE INVENTION

Figure 1:
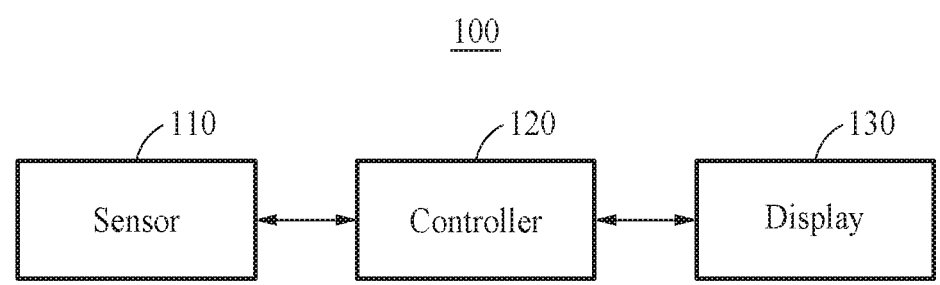
FIG. 1 illustrates a schematic block diagram of an image processing device according to an embodiment.

A specific structural or functional description of embodiments according to the concept of the present invention this specification has been merely illustrated for the purpose of describing the embodiments according to the concept of the present invention, and the embodiments according to the concept of the present invention may be implemented in various forms and are not limited to embodiments described in this specification.

The embodiments according to the concept of the present invention may be changed in various ways and may have various forms, and thus the embodiments are illustrated in the drawings and described in detail in this specification. However, this is not intended to limit the embodiments according to the concept of the present invention to specific disclosed forms and includes all of changes, equivalents or substitutes included in the spirit and technical scope of the present invention.

Terms such as "first" or "second" may be used for describing various components, but the components should not be limited by the terms. The terms may be used only for distinguishing one component from other components, for example, a first component may be referred to as a second component, and similarly, a second component may be referred to as a first component, without departing from the claims according to the concept of the present invention.

It will be understood that when a component is referred to as being "coupled with/to" or "connected to" another component, it can be directly coupled with/to or connected to the other component or an intervening component may be present. In contrast, when a component is referred to as being "directly coupled with/to" or "directly connected to" another component, it should be understood that there are no intervening component. Other expressions describing the relationships among the elements, for example, "between," "directly between" or "adjacent to" and "directly adjacent to" may also be analyzed similarly.

The terms used in the specifications are used only for describing specific embodiments, is not intended to limit the prevent invention. The expression of singular number includes the expression of plural number unless clearly intending otherwise in a context. In the specification, it should be understood that terms of "comprise", "have", and the like are to designate the existence of a feature disclosed in the specification, a numeral, a step, an input, a constituent element, a part, or a combination thereof, and do not previously exclude a possibility of existence or supplement of one or more other features, numerals, steps, inputs, constituent elements, parts, or combinations thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

Hereinafter, embodiments will be described with reference to the accompanying drawings. However, the scope of the patent application is restricted or limited by these embodiments. The same reference numerals shown in each drawing represent the same members.

Figure 2A:
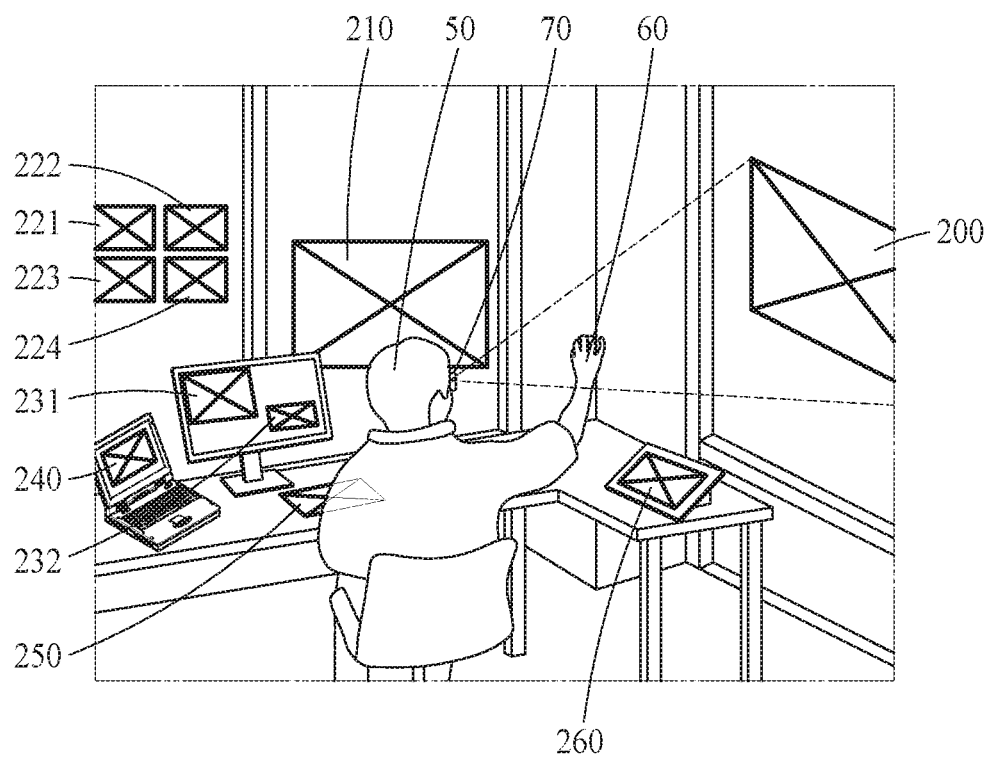
FIG. 2A is an example of a drawing illustrating an operation of an image processing device shown in FIG. 1.
Figure 2B:
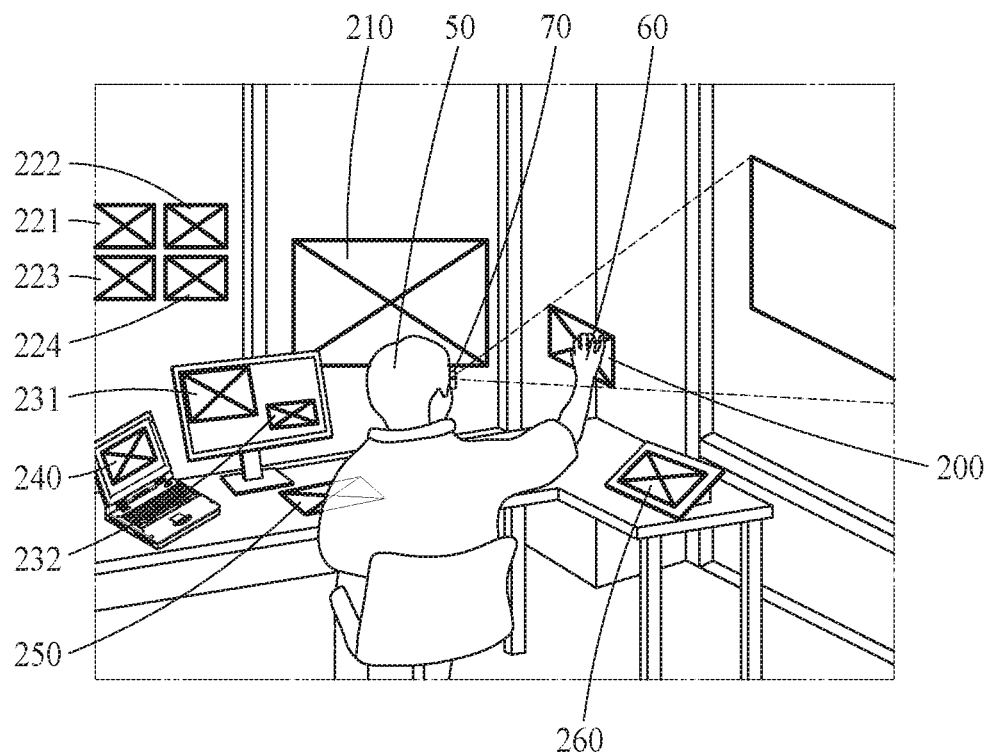
FIG. 2B is another example of a drawing illustrating an operation of an image processing device shown in FIG. 1.

FIG. 1 illustrates a schematic block diagram of an image processing device according to an embodiment. FIG. 2A is an example of a drawing illustrating an operation of an image processing device shown in FIG. 1. FIG. 2B is another example of a drawing illustrating an operation of an image processing device shown in FIG. 1.

Referring to FIGS. 1 to 2B, an image processing device 100 may include a sensor 110, a controller 120, and a display 130.

The image processing device 100 may implement augmented reality (AR) or virtual reality (VR). That is, a user 50 may experience AR or VR using the image processing device 100.

The user 50 may control virtual windows 200, 210, 221, 222, 223, 224, 231, 232, 240, 250, and 260 using the image processing device 100. The virtual windows 200, 210, 221, 222, 223, 224, 231, 232, 240, 250, and 260 may refer to windows which are present virtually on AR or VR. For example, the virtual windows 200, 210, 221, 222, 223, 224, 231, 232, 240, 250, and 260 may be implemented with circles or polygons (triangles, quadrangles, pentagons, or the like).

The user 50 may view a text document, a photo, a video, or the like using the virtual windows 200, 210, 221, 222, 223, 224, 231, 232, 240, 250, and 260. Furthermore, the user 50 may run an application using the virtual windows 200, 210, 221, 222, 223, 224, 231, 232, 240, 250, and 260. The user 50 may execute a function unique to the application using the application. For example, the user 50 may execute a function, such as weather forecast, a calendar, a scheduler, a message, a mail, a game, or a music player, using the application.

The image processing device 100 may be implemented as a portable electronic device. For example, the image processing device 100 may be implemented as a smart device. The smart device may include a head mounted display (HMD), smart glasses, a smart watch and a smart band. That is, the image processing device 100 may be a wearable device which is capable of or suitable for being worn on the user 50.

The sensor 110 may obtain a gaze vector of the user 50. For example, the sensor 110 may track a gaze of the user 50 to obtain a frustum based on a vector to which the gaze points.

The sensor 110 may obtain a location of a hand 60 of the user 50. For example, the sensor 110 may obtain a location of a fingertip of the hand 60.

Furthermore, the sensor 110 may obtain a distance between the eyes 70 of the user 50 and the hand 60 of the user 50.

The sensor 110 may transmit the obtained information to the controller 120. For example, the controller 110 may receive the gaze of the user 50, the distance between the eyes 70 and the hand 60, and the location of the hand 60 from the sensor 110.

The controller 120 may control the virtual windows 200, 210, 221, 222, 223, 224, 231, 232, 240, 250, and 260 based on the information received from the sensor 110. That is, the controller 120 may perform at least one of activating, selecting, moving, scaling, and placing the virtual windows 200, 210, 221, 222, 223, 224, 231, 232, 240, 250, and 260 based on at least one of the distance between the eyes 70 and the hand 60 and the location of the hand 60. For example, the controller 120 may activate, select, move, scale, and place the virtual windows 200, 210, 221, 222, 223, 224, 231, 232, 240, 250, and 260. At this time, the activation may be a state indicating that it is possible to select the virtual windows 200, 210, 221, 222, 223, 224, 231, 232, 240, 250, and 260.

The controller 120 may control the virtual windows 200, 210, 221, 222, 223, 224, 231, 232, 240, 250, and 260 using projective geometry in the manner of "what you see is what you get (WYSIWYG)," in a frustum of the user 50. For example, the controller 120 may control the virtual window 200 in a frustum obtained from a gaze of the user 50.

Referring to FIG. 2A, the user 50 may gaze at the virtual window 200 to be selected and may position the hand 60 in a frustum. Thus, the controller 120 may activate the virtual window 200. For example, the hand 60 of the user 50 is placed on the virtual window 200, that is, when the hand 60 of the user 50 and the virtual window 200 are overlapped with each other, the controller 120 may activate the virtual window 200.

Referring to FIG. 2B, the user 50 may select the activated virtual window 200 through a motion of a fingertip of the hand 60. For example, the user 50 may adjust a distance between the end of the thumb and the end of the index finger to a reference value or less to select the activated virtual window 200. Thus, the sensor 110 may transmit a location of the hand 60 of the user 50 to the controller 120.

The controller 120 may select the virtual window 200 based on the location of the hand 60. The controller 120 may summon the selected virtual window 200 to the hand 60. That is, the controller 120 may position the virtual window 200 to the hand 60 of the user 50 using inverse projective geometry. At this time, a plane where the hand 60 of the user 50 is located in the frustum may refer to a picture plane. That is, the controller 120 may inversely project the virtual window onto the picture plane. In this case, the controller 120 may keep an apparent size of the virtual window 200 constant by using inverse projective geometry for the virtual window 200. The user 50 may conveniently move or scale and place the selected virtual window 200.

Furthermore, the controller 120 may deselect the selected virtual window 200. For example, when a distance between the end of the thumb of the user 50 and the end of the index finger of the user 50 is greater than a reference value, the selected virtual window 200 may be deselected. Thus, the deselected virtual window 200 may return to a plane location specified by the user while maintaining the apparent size.

The controller 120 may place the virtual windows 200, 210, 221, 222, 223, and 224 parallel to a wall surface, in response to an input of the user 50. Furthermore, the controller 120 may place the virtual windows 231, 232, 240, and 260 to be orthogonal to a gaze vector of the user 50, in response to an input of the user 50. The controller 120 may place the virtual window 250 on a desk surface in response to an input of the user 50.

The controller 120 may control the virtual windows 200, 210, 221, 222, 223, 224, 231, 232, 240, 250, and 260 based on the distance between the eyes 70 and the hand 60, received from the sensor 110. For example, the controller 120 may select, scale (scale up or down), and place the virtual windows 200, 210, 221, 222, 223, 224, 231, 232, 240, 250, and 260.

When the controller 120 scales up or down the virtual windows 200, 210, 221, 222, 223, 224, 231, 232, 240, 250, and 260, absolute sizes of the virtual windows 200, 210, 221, 222, 223, 224, 231, 232, 240, 250, and 260 may be kept constant. That is, the controller 120 may keep the absolute sizes of the virtual windows 200, 210, 221, 222, 223, 224, 231, 232, 240, 250, and 260 constant and may change apparent sizes to perform a scaling up or down operation.

The display 130 may implement VR or AR in response to control of the controller 120. That is, the display 130 may provide an environment where the user 50 easily controls the virtual windows 200, 210, 221, 222, 223, 224, 231, 232, 240, 250, and 260 in VR or AR.

Figure 3A:
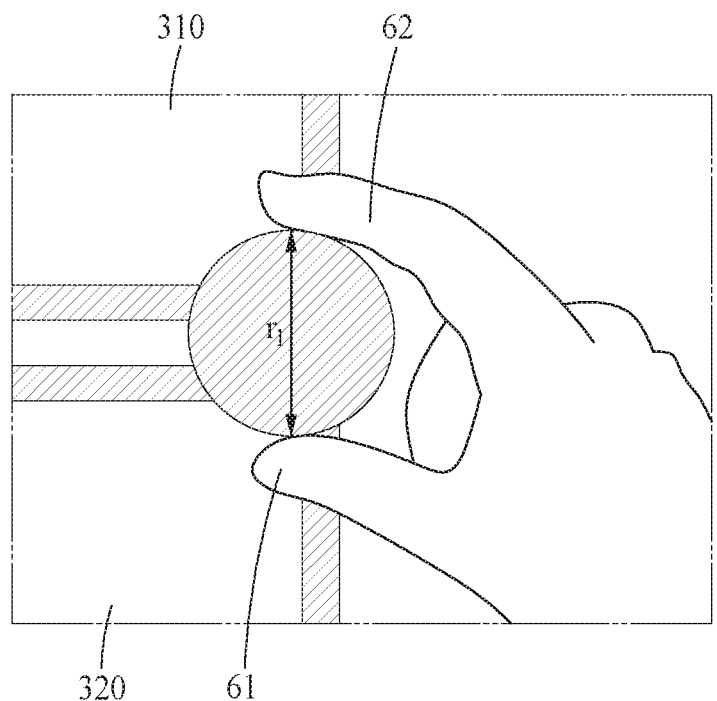
FIG. 3A is an example of a drawing illustrating an operation where a controller shown in FIG. 1 selects a virtual window.
Figure 3B:
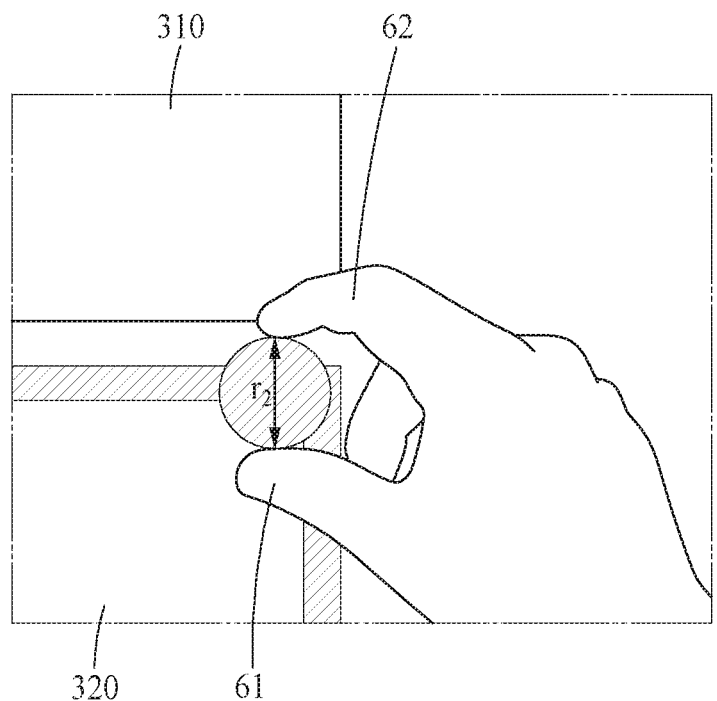
FIG. 3B is another example of a drawing illustrating an operation where a controller shown in FIG. 1 selects a virtual window.
Figure 3C:
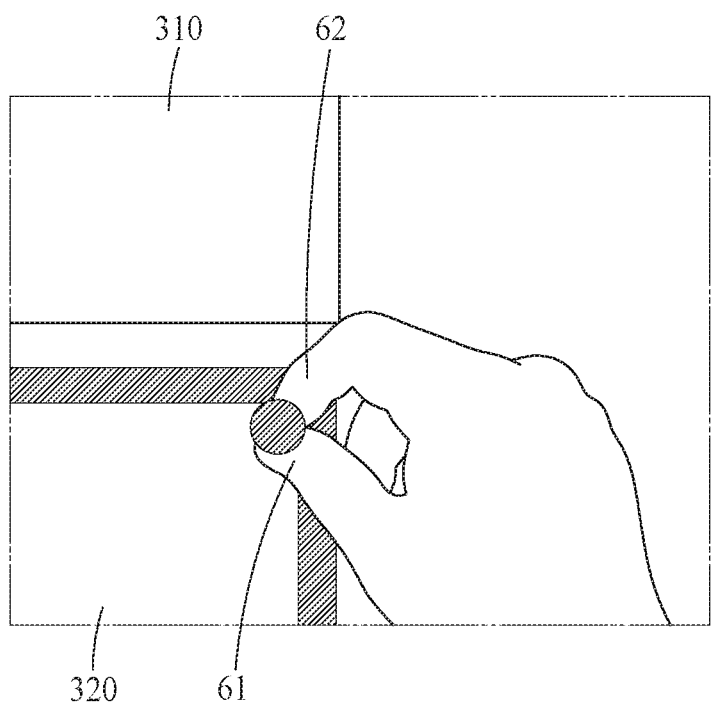
FIG. 3C is another example of a drawing illustrating an operation where a controller shown in FIG. 1 selects a virtual window.
Figure 4A:
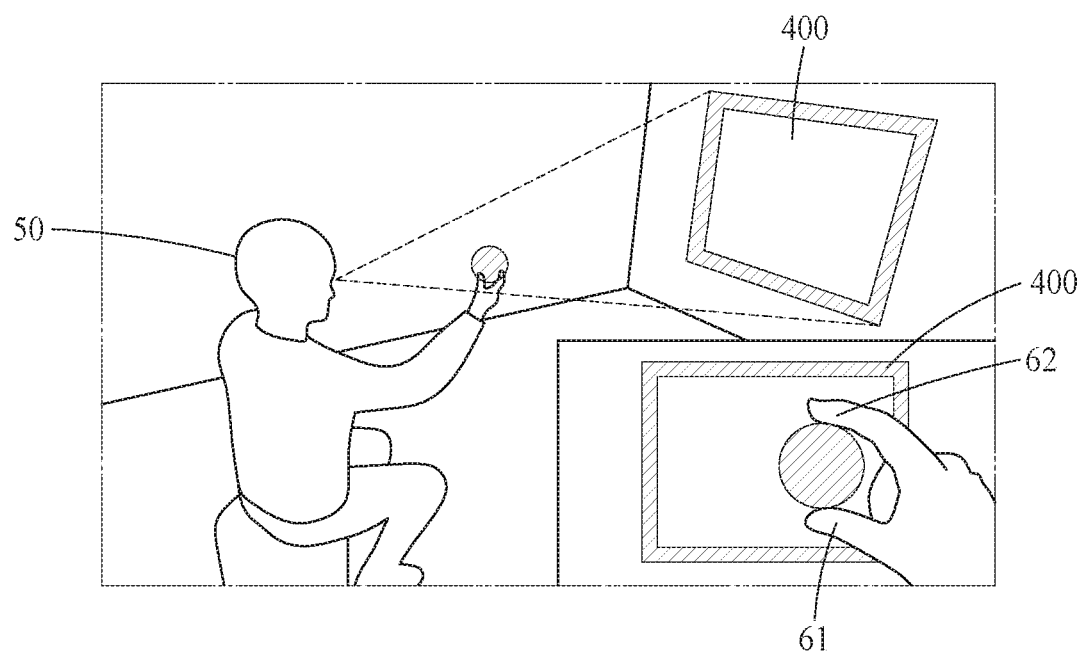
FIG. 4A is an example of a drawing illustrating interaction between a user and an image processing device with respect to FIGS. 3A to 3C.
Figure 4B:
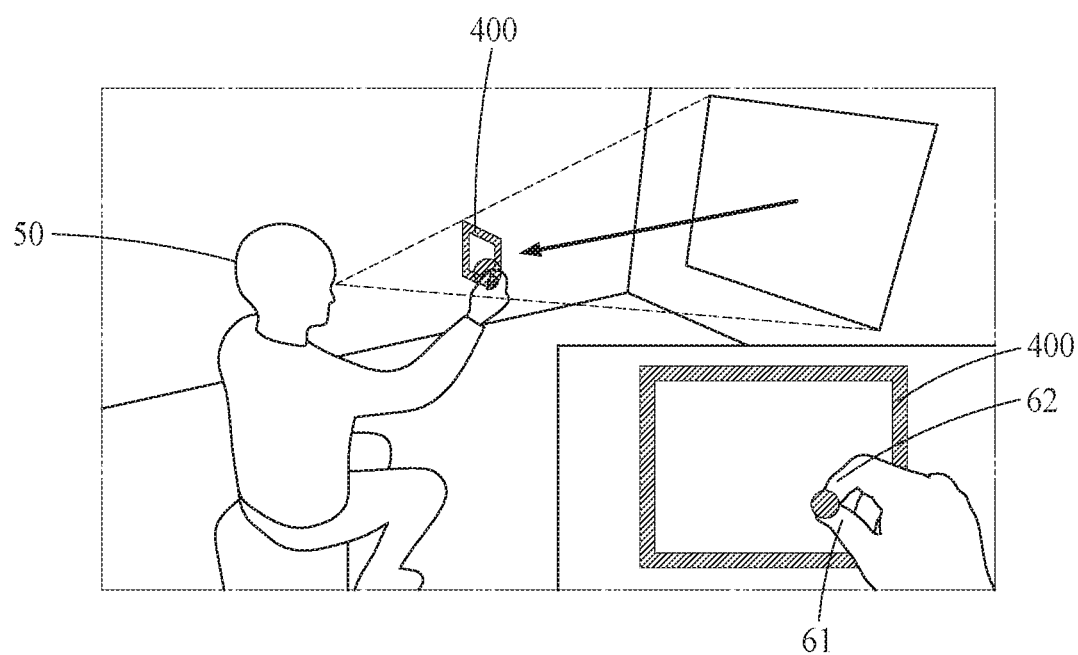
FIG. 4B is an example of a drawing illustrating interaction between a user and an image processing device with respect to FIGS. 3A to 3C.

FIG. 3A is an example of a drawing illustrating an operation where a controller shown in FIG. 1 selects a virtual window. FIG. 3B is another example of a drawing illustrating an operation where a controller shown in FIG. 1 selects a virtual window. FIG. 3C is another example of a drawing illustrating an operation where a controller shown in FIG. 1 selects a virtual window. FIG. 4A is an example of a drawing illustrating interaction between a user and an image processing device with respect to FIGS. 3A to 3C. FIG. 4B is an example of a drawing illustrating interaction between a user and an image processing device with respect to FIGS. 3A to 3C.

Referring to FIGS. 3A to 4B, a user 50 may position a hand 60 in a frustum where virtual windows 310 and 320 are present. The user 50 may adjust locations of the thumb 61 and the index finger 62 to generate a cursor in VR or AR and may activate and select the virtual windows 310 and 320.

For example, a sensor 110 may obtain and transmit a location of the end of the thumb 61 of the user 50 and a location of the end of the index finger 62 to a controller 120.

The controller 120 may generate a cursor based on the location of the end of the thumb 61 and the location of the end of the index finger 62. For example, when a distance between the end of the thumb 61 and the end of the index finger 62 is less than or equal to a reference value, the controller 120 may generate a cursor.

The cursor generated by the controller 120 may be in the shape of a circle. For example, the controller 120 may set the distance between the end of the thumb 61 and the end of the index finger 62 to a diameter of the cursor.

The controller 120 may activate and select the virtual windows 310 and 320 based on the cursor. For example, the controller 120 may activate the virtual windows 310 and 320 overlapped with the cursor. The controller 120 may perform at least one of selecting, moving, scaling, and placing the activated virtual windows 310 and 320.

Referring to FIG. 3A, the user 50 may widen a distance $r_1$ between the end of the thumb 61 and the end of the index finger 62. Thus, the controller 120 may generate a cursor with a diameter of $r_1$ and may activate the two virtual windows 310 and 320 overlapped with the cursor with the diameter of $r_1$.

Referring to FIG. 3B, the user 50 may narrow a distance $r_2$ between the end of the thumb 61 and the end of the index finger 62. Thus, the controller 120 may generate a cursor with a diameter of $r_2$ and may activate the one virtual window 320 overlapped with the cursor with the diameter of $r_2$.

Referring to FIG. 3C, the user 50 may make the end of the thumb 61 touch the end of the index finger 62. Thus, the controller 120 may select the activated virtual window 320. That is, the controller 120 may inversely project the virtual window 320 onto a picture plane corresponding to a location of the hand 60. At this time, the virtual window 320 may be inversely projected on the picture plane while maintaining its apparent size. The controller 120 may move the selected virtual window 320.

A description will be given of a configuration where the user 50 and an image processing device 100 interact with each other to activate and select the virtual windows 310 and 320 in VR or AR, with reference to FIGS. 4A and 4B.

Referring to FIG. 4A, the user 50 may narrow a distance between the end of the thumb 61 and the end of the index finger 62. The controller 120 may generate a cursor based on a location of the hand 60 of the user 50. The controller 120 may activate a virtual window 400 overlapped with the cursor.

Referring to FIG. 4B, the user 50 may make the end of the thumb 61 touch the end of the index finger 62. Thus, the controller 120 may select the virtual window 400. That is, the controller 120 may inversely project the virtual window 400 onto a picture plane corresponding to the hand 60 of the user 50. At this time, apparent sizes of the virtual window 400 may be the same as each other. The controller 120 may move the virtual window 400 in response to an input of the user 50.

Figure 5A:
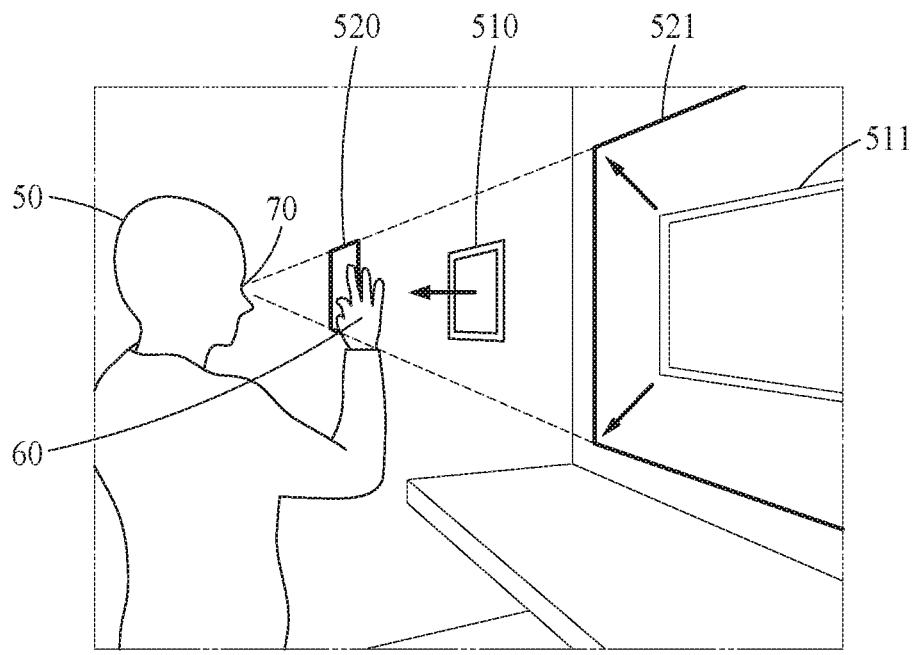
FIG. 5A is an example of a drawing illustrating an operation where a controller shown in FIG. 1 scales and positions a virtual window.
Figure 5B:
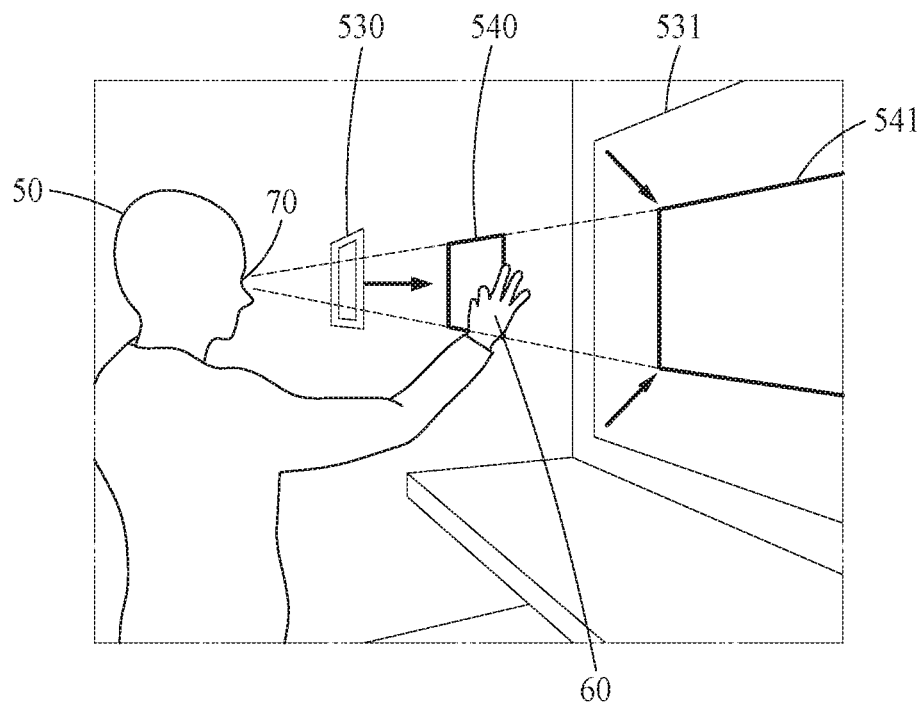
FIG. 5B is another example of a drawing illustrating an operation where a controller shown in FIG. 1 scales and positions a virtual window.
Figure 6:
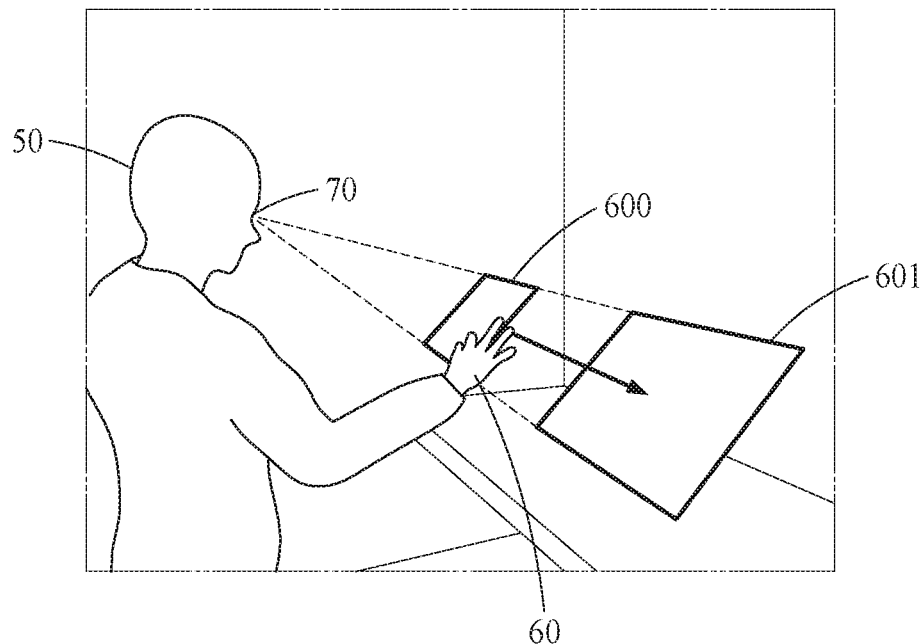
FIG. 6 is an example of a drawing illustrating an operation where a controller shown in FIG. 1 places a virtual window.

FIG. 5A is an example of a drawing illustrating an operation where a controller shown in FIG. 1 scales and positions a virtual window. FIG. 5B is another example of a drawing illustrating an operation where a controller shown in FIG. 1 scales and positions a virtual window. FIG. 6 is an example of a drawing illustrating an operation where a controller shown in FIG. 1 places a virtual window.

Referring to FIGS. 5A to 6, a controller 120 may activate, select, and scale virtual windows 510, 511, 520, 521, 530, 531, 540, 541, 600 and 601 based on locations of the eyes 70 of a user 50 and a location of the hand 60.

Referring to FIG. 5A, it is shown that the controller 120 scales up and places the virtual window 511 in response to an input of the user 50.

The user 50 may select and bring the virtual window 511 near him or her.

That is, the controller 120 may select the virtual window 511 in response to a selection of the user. For example, the controller 120 may inversely project the selected virtual window 510 onto a picture plane corresponding to the hand 60. The selected virtual window 510 may be inversely projected while maintaining its apparent size. That is, the virtual window 511 and the selected virtual window 510 may be the same in apparent size as each other.

In response to a hand motion of the user 50, the controller 120 may move the selected virtual window 510 to a location of the virtual window 520. The controller 120 may scale up the virtual window 510 based on the locations of the eyes 70 and the location of the hand 60. At this time, the virtual window 510 and the virtual window 520 may be the same in absolute size as each other and may differ in apparent size from each other. For example, the virtual window 520 may be larger in apparent size than the virtual window 510. That is, the controller 120 may scale up the virtual window 510 to the virtual window 520.

The user 50 may deselect the virtual window 520. For example, the user 50 may separate the thumb 61 from the index finger 62 to deselect the virtual window 520. Thus, the controller 120 may place the virtual window 520 on a plane (e.g., a wall or the like) located in a frustum. At this time, the virtual window 520 and the virtual window 521 may be the same in apparent size as each other and may differ in absolute size from each other. For example, the virtual window 521 may be larger in absolute size than the virtual window 520. That is, through a series of processes, the controller 120 may place the virtual window 521 on a plane in a state where the virtual window 521 is scaled up compared to the virtual window 511.

Referring to FIG. 5B, it is shown that the controller 120 scales down and places the virtual window 531 in response to an input of the user 50. The user 50 may select and bring the virtual window 531 near him or her.

That is, the controller 120 may select the virtual window 531 in response to a selection of the user 50. For example, the controller 120 may inversely project the selected virtual window 530 onto a picture plane corresponding to the hand 60. The selected virtual window 530 may be inversely projected while maintaining its apparent size. That is, the virtual window 531 and the selected virtual window 530 may be the same in apparent size as each other.

In response to a hand motion of the user 50, the controller 120 may move the selected virtual window 530 to a location of the virtual window 540. The controller 120 may scale down the virtual window 530 based on the locations of the eyes 70 and the location of the hand 60. At this time, the virtual window 530 and the virtual window 540 may be the same in absolute size as each other and may differ in apparent size from each other. For example, the virtual window 540 may be smaller in apparent size than the virtual window 530. That is, the controller 120 may scale down the virtual window 530 to the virtual window 540.

The user 50 may deselect the virtual window 540. For example, the user 50 may separate the thumb 61 from the index finger 62 to deselect the virtual window 540. Thus, the controller 120 may place the virtual window 540 on a plane (e.g., a wall or the like) located in a frustum. At this time, the virtual window 540 and the virtual window 541 may be the same in apparent size as each other and may differ in absolute size from each other. For example, the virtual window 541 may be larger in absolute size than the virtual window 540. That is, through a series of processes, the controller 120 may place the virtual window 541 on a plane in a state where the virtual window 541 is scaled down compared to the virtual window 531.

Referring to FIG. 6, the controller 120 may place the virtual window 600 to be orthogonal to a gaze vector of the user 50. For example, the controller 120 may position the virtual window 601 in response to an input of the user 50. That is, the controller 120 may project the virtual window 601 onto a picture plane which is orthogonal to the gaze vector of the user 50 and is touching with a physical plane. At this time, the virtual window 600 and the virtual window 601 may be the same in apparent size as each other.

Figure 7:
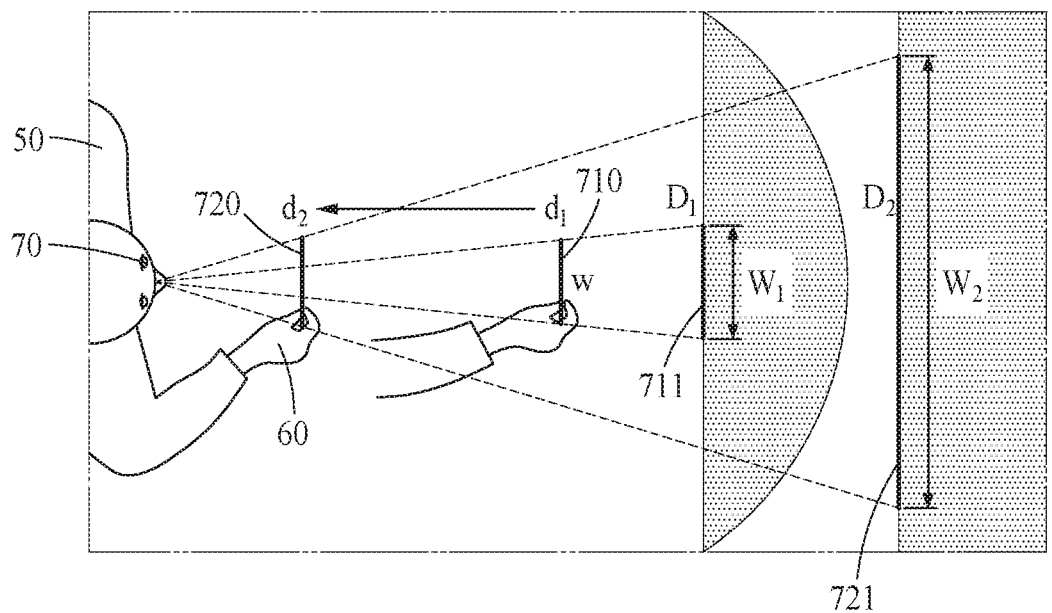
FIG. 7 is an example of a drawing illustrating a zoom factor of a virtual window.
Figure 8:
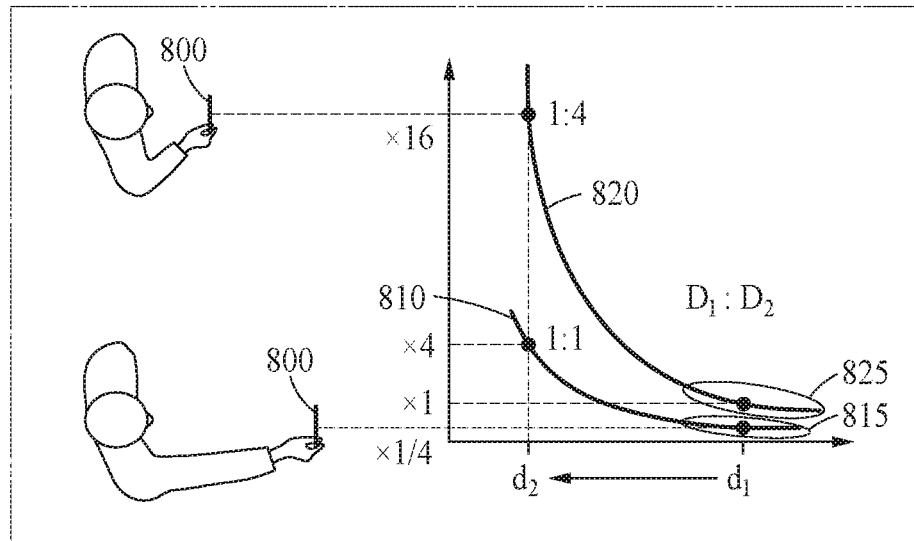
FIG. 8 is another example of a drawing illustrating a zoom factor of a virtual window.

FIG. 7 is an example of a drawing illustrating a zoom factor of a virtual window. FIG. 8 is another example of a drawing illustrating a zoom factor of a virtual window.

Referring to FIG. 7, a user 50 may select a virtual window 711 with a width of $W_1$, located on a wall of a distance of $D_1$. A controller 120 may inversely project the selected virtual window 711 onto a picture plane of the hand 60 of the user 50. That is, the controller 120 may summon and position the virtual window 711 to a virtual window 710. At this time, the selected virtual window 710 may have a width of w.

The user 50 may move the virtual window 710 located in a distance of $d_1$ to a distance of $d_2$. Because a distance between the eyes 70 and the hand 60 of the user 50 becomes smaller from $d_1$ to $d_2$, the controller 120 may scale up the virtual window 710.

When the user 50 separates the thumb 61 from the index finger 62, the controller 120 may position a virtual window 720 on a wall to have a width of $W_2$ in a distance of $D_2$. Thus, the virtual window 711 and may be scaled up and positioned as the virtual window 721.

Referring to FIG. 8, a description will be given of a zoom factor when the user 50 zooms in on a distance between the eyes 70 and the hand 60 from 0.4 m to 0.1 m.

Graph 810 indicates a graph when $D_1:D_2$ is 1:1, and graph 820 indicates a graph when $D_1:D_2$ is 1:4. Regions 815 and 825 may refer to regions which have a gentle slope on the respective graphs 810 and 820. The user 50 may minutely control a virtual window 800 in the regions 815 and 825.

In conjunction with the scaling of the controller 120, the zoom factor may be represented as Equation 1.

$$\text{zoom} = \frac{W_2}{W_1} = \frac{wD_2/d_2}{wD_1/d_1} = \frac{D_2 d_1}{D_1 d_2} \quad \text{[Equation 1]}$$

Herein, $W_1$ is the width of the window located on the wall at the distance of $D_1$, $W_2$ is the width of the window located on the wall at the distance of $D_2$, w is the width of the virtual window 720, $d_1$ is the distance between the virtual window 710 and the eyes 70 of the user 50, and $d_2$ is the distance between the virtual window 710 and the eyes 70 of the user 50.

For convenience of description in FIGS. 7 and 8, the description is given of, but not necessarily limited to, the operation where the user 50 and the controller 120 interact with each other to scale up the virtual window 710 and 800. There may be 9 cases as presented in Table 1 below.

TABLE 1

| zoom | $D_2 < D_1$ | $D_2 = D_1$ | $D_2 > D_1$ |
|---|---|---|---|
| $d_2 < d_1$ | 1 | 4 | 16 |
| $d_2 = d_1$ | ¼ | 1 | 4 |
| $d_2 > d_1$ | ¹⁄₁₆ | ¼ | 1 |

That is, the controller 120 may scale the virtual window from ¹⁄₁₆ times to 16 times using projective geometry.

Figure 9:
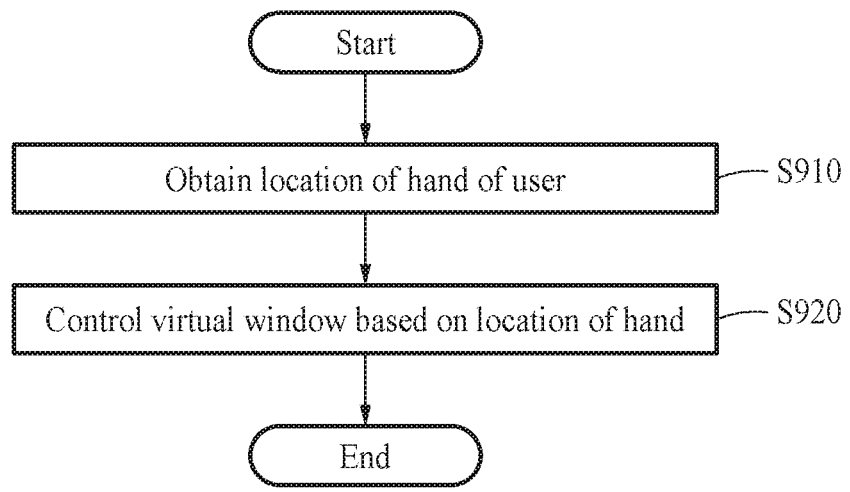
FIG. 9 illustrates a flowchart of an image processing method according to an embodiment.

FIG. 9 illustrates a flowchart of an image processing method according to an embodiment.

Referring to FIG. 9, an image processing device 100 may obtain a location of the hand 60 of a user 50 (S910). The image processing device 100 may obtain a location of a fingertip of the user 50. At this time, the image processing device 100 may generate a cursor based on the location of the fingertip. The image processing device 100 may obtain a distance between the eyes 70 and the hand 60 of the user 50.

The image processing device 100 may control a virtual window based on the location of the hand 60. For example, the image processing device 100 may perform at least one of activating, selecting, moving, scaling, and placing the virtual window. The image processing device 100 may activate and select a virtual window overlapped with the cursor. For example, when a distance between the end of the thumb of the hand 60 and the end of the index finger of the hand 60 is less than or equal to a reference value, the image processing device 100 may select a virtual window. The image processing device 100 may move and position a virtual window based on the location of the hand 60. Furthermore, the image processing device 100 may scale and position a virtual window based on the distance between the eyes 70 and the hand 60. When the distance between the end of the thumb of the hand 60 and the end of the index finger of the hand 60 is greater than the reference value, the image processing device 100 may deselect the selected virtual window 200. Thus, the deselected virtual window 200 may return to a location on a plane specified by the user 50 while maintaining its apparent size.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A 3D window management method in a method for processing an image in virtual reality (VR) or augmented reality (AR), the 3D window management method comprising:
    obtaining information by sensing a user; and
    placing a virtual window disposed at a first location at a second location by adjusting an absolute size of the virtual window while maintaining an apparent size of the virtual window based on the information, wherein the absolute size and the apparent size are physical sizes.

2. The 3D window management method of claim 1, wherein the virtual window disposed at the second location is controllable by the user.

3. The 3D window management method of claim 1, wherein the placing comprises:
    activating the virtual window disposed at the first location based on the information; and
    selecting the activated virtual window based on the information.

4. The 3D window management method of claim 3, wherein the activating comprises activating the virtual window disposed at the first location based on locations of eyes of the user and a location of a hand of the user.

5. The 3D window management method of claim 3, wherein the selecting comprises selecting the activated virtual window based on a motion of a hand of the user.

6. The 3D window management method of claim 1, wherein the second location is a location of a hand of the user.

7. The 3D window management method of claim 1, further comprising:
    scaling up or down the virtual window by changing the apparent size while maintaining the absolute size based on the information, after the virtual window disposed at the first location is placed at the second location.

8. The 3D window management method of claim 7, further comprising:
    returning the scaled up or down virtual window to the first location while maintaining the apparent size.

9. The 3D window management method of claim 1, further comprising:
    moving the virtual window to a third location while maintaining the absolute size based on the information, after the virtual window disposed at the first location is placed at the second location.

10. The 3D window management method of claim 9, further comprising:
    placing the virtual window moved to the third location at a fourth location based on locations of eyes of the user and a location of a hand of the user, while maintaining the apparent size.

11. The 3D window management method of claim 1, wherein a direction between the first position and the second position corresponds to a direction of movement relative to the information collected by the sensor.

12. The 3D window management method of claim 1, wherein the first location and the second location are on vertical cross sections at different distances from a vertex within a same quadrangular pyramid-shaped frustum.

13. A 3D window management device in an apparatus for processing an image in VR or AR, the 3D window management device comprising:
    a sensor to sense a user and obtain information;
    a controller to place a virtual window disposed at a first location at a second location by adjusting an absolute size of the virtual window while maintaining an apparent size of the virtual window based on the information, in VR or AR, wherein the absolute size and the apparent size are physical sizes; and
    a display to implement VR or AR in response to control of the controller.

14. The 3D window management device of claim 13, wherein the first location and the second location are on vertical cross sections at different distances from a vertex within a same quadrangular pyramid-shaped frustum.

* * * * *